(12) United States Patent
Ganapathiappan

(10) Patent No.: US 6,716,949 B2
(45) Date of Patent: Apr. 6, 2004

(54) AMPHIPATHIC POLYMER PARTICLES AND METHODS OF MANUFACTURING THE SAME

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/956,431

(22) Filed: Sep. 20, 2001

(65) Prior Publication Data

US 2003/0060562 A1 Mar. 27, 2003

(51) Int. Cl.⁷ .............. C08J 20/06; C08J 20/44
(52) U.S. Cl. ............... 526/317.1; 526/307.1; 526/319; 526/306; 526/310; 526/312; 526/322; 526/324; 526/329.7
(58) Field of Search .......... 526/307.1, 317.1, 526/319, 306, 310, 312, 322, 324, 329.7

(56) References Cited

U.S. PATENT DOCUMENTS

| | | | |
|---|---|---|---|
| 5,601,880 A | * 2/1997 | Schwarte et al. | 427/407.1 |
| 5,707,543 A | * 1/1998 | Akashi et al. | 252/299.01 |
| 6,001,947 A | * 12/1999 | Brunnemann et al. | 528/28 |
| 6,057,384 A | * 5/2000 | Nguyen et al. | 523/160 |
| 6,090,193 A | * 7/2000 | Nigam et al. | 106/31.27 |
| 6,106,988 A | * 8/2000 | Furukawa et al. | 430/109.3 |
| 6,117,222 A | 9/2000 | Nigam et al. | |
| 6,121,371 A | 9/2000 | Matyjaszewski et al. | 524/804 |
| 6,248,805 B1 | * 6/2001 | Nguyen et al. | 523/160 |
| 6,277,437 B1 | 8/2001 | Helmer et al. | 427/136 |
| 6,280,905 B1 | * 8/2001 | Koshimura et al. | 430/281.1 |
| 6,368,774 B1 | * 4/2002 | Sakurai et al. | 430/288.1 |
| 6,417,249 B1 | * 7/2002 | Nguyen et al. | 523/201 |

FOREIGN PATENT DOCUMENTS

FR 2797633 2/2001

* cited by examiner

*Primary Examiner*—Tatyana Zalukaeva

(57) ABSTRACT

The invention is directed to amphipathic polymeric particles that serve as both the dispersant and the binder in water based inks, ink compositions containing these particles, and methods for making the particles. The polymeric particles contain both hydrophilic and hydrophobic moieties with a pre-determined structure, and have an average diameter of 50 to 500 nm. The amphipathic polymeric particles may be prepared by a side-chain conversion method or a polymerization process involving an ATRP step, with or without a cross-linking agent. This invention improves the stability of polymer and inks by both ionic and steric stabilization of the suspended polymer particles.

16 Claims, No Drawings

AMPHIPATHIC POLYMER PARTICLES AND METHODS OF MANUFACTURING THE SAME

TECHNICAL FIELD

The technical field relates to amphipathic polymeric particles that serve as dispersants and binders in ink compositions, ink compositions containing the same, and methods for making the particles and the inks. More specifically, the technical field relates to polymeric particles that increase the suspension stability, water fastness, smear fastness, and light fastness of inks.

BACKGROUND

Inks are among the oldest known technologies. Historians believe inks were utilized in China and Egypt as early as 2,500 B.C. Nonetheless, significant advances in the ink art continue to occur, especially when formulating compositions for use in more modem dispensers such as ink jet printers.

Inks for use in ink jet printers generally comprise an aqueous carrier and a colorant. The colorant can be a dye or a pigment—the distinction being that dyes are soluble in aqueous and/or organic solvents whereas pigments are relatively insoluble.

Inks containing soluble dyes, however, exhibit numerous problems. These problems include: poor water fastness; poor light fastness; clogging of the ink jet channels as a result of solvent evaporation, changes in the dye solubility, and/or dye crystallization; bleeding and feathering on the printed page; poor thermal stability; and chemical instability, including but not limited to poor oxidation resistance.

Many of these problems are minimized by replacing the dyes with pigments. In general, pigments have superior properties when compared to dyes, including good water fastness, good light fastness, thermal stability, oxidative stability and compatibility with paper. However, difficulties are encountered in maintaining the pigments in a stable and uniform suspension. If the pigments coagulate and/or fall out of suspension, the utility of the ink is greatly diminished, if not completely destroyed.

Polymeric dispersants are often employed to increase the shelf life of the pigment suspensions. Generally speaking, these dispersants contain hydrophobic groups that absorb onto the pigment particle surfaces through acid-base interactions, Van der Waals forces, or physical entanglement or entrapment. In addition, the dispersants contain hydrophilic groups that extend out into the aqueous medium. In this way, the dispersants associate the pigment with the aqueous carrier.

In the dispersant, large particles are undesirable since they clog the ink jet and are difficult to be suspend in water over a long period of time without settlement. Moreover, it is difficult to precisely control the identity, length, weight and distribution of the hydrophobic and hydrophilic groups in the polymer dispersant. When these properties are not controlled, the dispersant may not be able to fully cover the water-insoluble pigments to create an electrostatic layer that prevents aggregation. In some cases, the dispersant may even act as a flocculent which is the opposite desired effect.

Regardless of the colorant employed, the adherence of the ink on the substrate is always a major issue. Colorants must be chemically or physically bound to the treated surface, e.g., paper, in order to prevent bleeding, smearing or rubbing after the ink has dried. Accordingly, polymeric binders are often employed to chemically and/or physically entrap the colorant.

The present inventor has conducted a great deal of research in the field of inks. Much of this work is directed to polymeric dispersants and/or binders. Patents that have issued on this work include the following: U.S. Pat. Nos. 5,972,552; 5,973,025; 5,990,202; 6,027,844; 6,057,384; 6,090,193; 6,117,222; 6,248,161 B1; and 6,248,805 B1. However, there remains a need for inks, that can be used in ink jet printers, which exhibit improved shelf-life, water fastness, smear fastness, and light fastness.

SUMMARY

The invention is directed to amphipathic polymeric particles that serve as both the dispersant and the binder in water based inks. The particles have an average diameter of 50 to 400 nm with a pre-determined structure, making them ideal for inclusion in any ink marketed for ink jet printers.

In a preferred embodiment, the polymeric particles are formulated from a combination of hydrophilic and hydrophobic unsaturated monomers. Combining hydrophilic and hydrophobic moieties into the polymeric particles facilitates association between the ink's aqueous carrier and water insoluble components. This association, in turn, increases the stability of the suspension and, thereby, the shelf-life of the ink. When the ink is applied to a substrate, e.g., paper, the particles bind the colorants to the substrate by forming a film over the colorants. The film conveys superior durability, e.g., water fastness, smear fastness, and light fastness, to the inked image.

In another preferred embodiment, a water-soluble dye with a polymerizable functional group is formulated into the polymeric particles. The optical density of the dye is preserved since it lies on the outside of the particle in the water phase. The dye itself acts like a stabilizing group for the particle. The durability of the printed images is enhanced since the dye is trapped in the water-insoluble dispersant which forms a protective film upon removal of water.

In yet another preferred embodiment, the shear stability of these polymers may be improved by incorporating cross-linkers to an extent of about 1% by weight.

The invention is also directed to methods for making the aforementioned particles. A preferred method employs an emulsion of water-insoluble long chain acid containing monomers (convertible monomers) and hydrophobic monomers to generate polymers that can be stably suspended in water over a long period of time. Specifically, the convertible monomers are introduced into the emulsion in a hydrophobic form and incorporated into the polymers. The side chain acid groups of the incorporated convertible monomers are then converted to anionic salts by adjusting the pH of the solution to a basic range (pH>7). The acid-to-salt conversion changes the Zeta potential and net surface charge of the polymer particles, and increases the stability of the polymer particles in colloidal systems.

Another preferred method entails a combination of atom transfer radical polymerization (ATRP) and emulsion polymerization. By utilizing ATRP in the process, the molecular weight of the particles and the distribution of hydrophilic and hydrophobic moieties can be carefully controlled.

Finally, the invention is directed to an environmentally friendly, water based ink that contains a vehicle, a colorant, a surfactant, and the aforementioned polymeric particles. Due to the presence of the amphipathic polymeric particles, these inks exhibit improved dispersion and shear stability, shelf-life, water fastness, smear fastness, and light fastness.

Definitions

As defined herein, the term "water fastness" refers to the resistance of an impression to dilution or removal by water. A water fast ink has a reduced tendency to wick, feather or be washed away. Water fastness can be measured by wetting the printing area with water and determining the optical density (OD) in the neighboring areas (defined as "background OD") before and after the exposure to water.

As defined herein, the term "smear fastness" refers to the resistance of an image to smear on contact with a hard object, such as the tip of a highlighter, under normal pressure. A smear is defined as the transfer of colorant from the printing area to the neighboring areas (background) by the object. Smear fastness can be measured by determining the change of the background OD after subjecting the printing area to a standard smearing force.

As defined herein, the term "light fastness" refers to the durability of a print when exposed to light. When an ink is light fast, it has fade resistance. It is generally thought that pigments have improved fade resistance over dyes but some of the newer dyes have shown that they can be comparable.

As defined herein, the term "shear stability" refers to the polymer particles' ability to maintain their original size under mechanical stress. Shear stability can be measured by subjecting the particles to mechanical stress and determining the change in particle size.

As defined herein, the term "convertible monomer" refers to monomers with long side chain acid groups. The convertible monomers are water insoluble in the monomer form. After polymerization, the acid group on the side chain of the convertible monomers can be converted to anionic salt by adjusting the pH of the solution to a basic range (pH>7), i.e., the hydrophobic monomer is incorporated into the polymer as a hydrophobic moiety, but is converted to a hydrophilic moiety under basic pH.

DETAILED DESCRIPTION

The polymeric particles of the present invention are formulated from a combination of convertible and hydrophobic unsaturated monomers (for methods involving side chain conversion) or a combination of hydrophilic and hydrophobic unsaturated monomers (for methods using ATRP process). The convertible or hydrophilic units of the polymer may be in the range of 1%–60% by weight, and preferably about 10% by weight. The hydrophobic units of the polymer may be in the range of 30%–99% by weight, and preferably about 90% by weight.

The hydrophilic portions of the polymeric particles associate the particles with the aqueous carrier in the ink composition. Generally, hydrophilic moieties include acidic functional groups, such as carboxylic, sulfonic acid, or phosphoric acid groups.

Monomers that may be used to form the hydrophilic moieties include acrylic acid, acrylamide, methacrylic acid, styrene sulfonates, vinyl imidazole, vinyl pyrrolidone, poly (ethylene glycol) acrylates and methacrylates, dimethylaminoethyl methacrylate, diethylaminoethyl methacrylate, t-butylaminoethyl methacrylate, dimethylaminoethyl acrylate, diethylaminoethyl acrylate, methacrylamide, dimethylacrylamide, dimethylaminopropyl methacrylamide, ethylene glycol methacrylate phosphate, 2-(methacryloyloxy)ethyl phthalate, 2-(methacryloyloxy) ethyl succinate, 3-sulfopropyl methacrylate and 3-sulfopropyl acrylate. Protected monomers that generate acrylic or methacrylic acid after removal of the protecting group may also be used. Suitable protected monomers include trimethylsilyl methacrylate, trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, 2-tetrahydropyranyl methacrylate, t-butyl methacrylate, t-butyl acrylate, methyl oxymethacrylate and vinyl benzoic acid. It should be noted that different monomers may require different polymerization conditions for optimal performance.

Preferred hydrophilic monomers are methacrylic acid, acrylic acid, and mixtures thereof.

Preferred convertible monomers are mono-methacryloyloxyethyl succinate, mono-acryloyloxyethyl succinate, mono-methacryloyloxyethyl phthalate, acrylamidobutyric acid, mono-methacryloyloxyethylmaleate and methacryloyloyethylphosphate.

The hydrophobic portions of the polymeric particles associate the particles with the insoluble organic pigment in the ink composition. Generally, hydrophobic moieties include alkyl, cycloalkyl, aromatic hydrocarbon, and styrene groups.

Monomers that may be used to form hydrophobic polymeric moieties include the following: $C_{1-20}$ alkyl or cycloalkyl acrylates and methacrylates; $C_{1-20}$ hydroxyalkyl acrylates and methacrylates, styrene, and mixtures thereof.

Preferred hydrophobic monomers are methyl methacrylate, butyl methacrylate, hexyl acrylate, ethyl hexylacrylate, styrene, and mixtures thereof.

The inclusion of hydrophilic and hydrophobic moieties in the polymeric particles facilitates the association of the ink's aqueous carrier and the ink's water insoluble components, such as pigments. This association, in turn, increases the stability of the suspension and, thereby, the shelf-life of the ink.

The shear stability of the polymer particles can be improved by incorporating cross-linkers into the polymers. Cross-linkers can be any monomers with polymerizable di- or polyfunctional groups. Preferred cross-linkers are ethylene glycol dimethacrylate, pentaerythritol tetraacrylate, pentaerythritol triacrylate, 3-(acryloyloxy)-2-hydroxypropyl methacrylate, ethyleneglycol dimethacrylamide, mono-2-(methacryloyloxyethyl) maleate, divinyl benzene, or other monomers with polymerizable di- or polyfunctional groups.

Cross linkers are utilized in a range of 0.1%–5% by weight of the total composition. Preferably, the extent of cross-linking is about 1% by weight, i.e., the final product contains 1% cross-linker by weight. The 1% cross-linking is sufficient to enhance shear stability without unduly affecting the physical properties of the polymer. However, polymers with low glass transition temperature (<25° C.) may need a higher amount of cross-linking, e.g., about 2% by weight.

Preparation of Amphipathic Polymers by Side-chain Conversion Method

In general, amphipathic polymers may be prepared by copolymerization of hydrophilic and hydrophobic monomers in an emulsion in the presence of surfactants. However, a major problem with the emulsion process is the low production rate of amphipathic polymers. Although both hydrophilic and hydrophobic monomers are present in the emulsion, they tend to stay in their respective phase of the emulsion and form hydrophilic or hydrophobic homopolymers (i.e., polymers containing only hydrophilic or hydrophobic monomers).

The present invention provides a method to produce amphipathic polymers with a desirable content of hydrophilic and hydrophobic moieties by starting the polymerization reaction with convertible monomers and hydrophobic monomers. The convertible monomers are long chain acid containing monomers that are capable of converting from a hydrophobic form to a hydrophilic form upon a change of pH. Because the emulsion has an acidic pH, the convertible monomers are in the hydrophobic form and can efficiently form heteropolymers with the hydrophobic monomers in the hydrophobic phase of the emulsion. After the polymerization, the acid group on the side chain of the convertible monomers may be converted to anionic salt form by adjusting the pH of the solution to a basic range (pH>7). This conversion changes the Zeta potential and the net charge of the polymer, and stabilizes the particles in an aqueous solution.

The side chain conversion method comprises the following two steps:

(1) Copolymerization of Convertible and Hydrophobic Monomers in an Emulsion

An emulsion of monomer mixture is prepared by mixing hydrophobic monomers, convertible monomers, and surfactants with water. Polymerization is initiated by adding a catalyst, such as potassium persulfate, to the monomer mixture and heating the mixture to an elevated temperature. The copolymerization step may be carried out in the presence of a polymerizable dye monomer to generate polymer particles with the colorant trapped in them. The polymers may also be cross-linked using a cross-linker described above to improve the shear stability.

(2) Conversion of Side Chain Groups

Stop the polymerization by reducing the temperature of the reaction mixture. A base is added to bring the pH of the reaction mixture into a basic range (pH>7). Examples of the base include, but are not limited to, sodium hydroxide, lithium hydroxide, potassium hydroxide and any organic amines or substituted organic amines or primary, secondary or tertiary amine. Examples of amines include, but are not limited to, triethyl amine, aminoethanol and diethylamine. The upshift of pH converts the side chain acid groups into anionic salts and changes the Zeta potential of the polymer particles. The reaction mixture may be filtered remove any precipitates formed during the polymerization. The polymeric particles obtained from the above-described process have an average diameter of 50 to 500 nm.

Preparation of Amphipathic Polymers by ATRP Method

The present invention also provides a method to control not only the hydrophilicity but also the size dispersivity of the amphipathic polymer particles.

The size of the polymer particles is an important concern in a ink composition. The nozzles in ink jet printers are decreasing in size. Nozzle openings are typically 50 to 80 $\mu$m in width or diameter for 300 dpi printers and 10 to 40 $\mu$m in 600 dpi printers. These small dimensions require inks that do not plug the small openings. The sizes of the polymer particles are preferably within the range of 50–500 nm and most preferably within the range of 150–300 nm.

In addition, the identity, length, weight and distribution of the hydrophobic groups in the polymer particles must be controlled to insure that these amphipathic polymer particles, acting as a dispersant in a ink composition, fully cover any water-insoluble pigment particles and create an electrostatic layer that prevents aggregation. Otherwise, the amphipathic particles may act as a flocculent.

Control over the particle size and the identity, length, weight and distribution of the hydrophobic groups is permitted by using Atom Transfer Radical Polymerization (ATRP) as the first step in the synthesis. ATRP is a relatively new method for preparing well-defined polymers and copolymers. ATRP is described, inter alia, in the following publications: U.S. Pat. Nos. 6,162,882; 6,124,411; 6,121,371; 6,111,022; 6,071,980; 5,945,491; 5,807,937; and 5,789,487. These patent descriptions of ATRP are hereby incorporated by reference. To date, the ATRP process has not been employed to synthesize dispersants for aqueous inks.

Briefly speaking, ATRP is a controlled, "living" polymerization based on the use of radical polymerization to convert monomers to polymers. The control of the polymerization afforded by ATRP is a result of the formation of radicals that can grow, but are reversibly deactivated to form dormant species. Reactivation of the dormant species allows for the polymer chains to grow again, only to be deactivated later. Such a process results in a polymer chain that slowly, but steadily, grows and has a well-defined end group. The polymerization is characterized by initiation where one initiator molecule generates, at most, one polymer chain and that all polymer chains grow at nearly the same time in the presence of a catalyst. This results in polymers whose average molecular weight is defined by the concentrations and the molecular weights of the initiator and the monomer.

The initiator is generally a simple alkyl halide. The catalyst is a transition metal that is completed by one or more ligands; the catalyst does not need to be used in a one-to-one ratio with the initiator but can be used in much smaller amounts. The deactivator can be formed in situ, or for better control, a small amount (relative to the catalyst) can be added.

The polymeric particles of the present invention may be prepared by a process employing the ATRP. The process comprises the following three steps:

(1) Primary ATRP of Hydrophilic Monomers in an Aqueous Solution

ATRP initiates controlled radical polymerization by reaction of an initiator and a water-soluble monomer in the presence of a transition metal and a ligand. The initiator can be any molecule containing a radically transferable atom or group. A preferred initiator is alkyl halide. The water-soluble monomers can be any hydrophilic monomers described above and are preferably poly ethylene glycol, acrylate, acrylate methylcarboxylate, styrene sulfonates, acrylate dye having sulfonate or carboxylate groups, and mixtures thereof.

The transition metal can be any transition metal or metal compound that is initially in a lower oxidation state or is reduced to the lower oxidation state in early stages of the reaction. The metal may be, but is not limited to, $Cu^{1+}$, $Cu^{2+}$, $Cu^0$, $Fe^{2+}$, $Fe^{3+}$, $Fe^0$, $Ru^{2+}$, $Ru^{3+}$, $Ru^0$, $Cr^{2+}$, $Cr^{3+}$, $Cr^0$, $Mo^{2+}$, $Mo^{3+}$, $Mo^0$, $W^{2+}$, $W^{3+}$, $Mn^{3+}$, $Mn^{4+}$, $Mn^0$, $Rh^{3+}$, $Rh^{4+}$, $Rh^0$, $Re^{2+}$, $Re^{3+}$, $Re^0$, $Pd^{2+}$, $Pd^0$, $Ni^{2+}$, $Ni^{3+}$, $Ni^0$, $Co^{1+}$, $Co^{2+}$, $V^{2+}$, $V^{3+}$, $Zn^{1+}$, $Zn^{2+}$, $Au^{1+}$, $Au^{2+}$, $Ag^{1+}$ and $Ag^{2+}$; preferred metals are $Cu^{1+}$, $Fe^{2+}$, $Ru^{2+}$, $Ni^{2+}$. Preferred metal compounds include Cu(I)Br, Cu(I)Cl, Cu(I)triflate, and Cu(II)triflate.

Preferred ligands include 2,2'-bipyridyl(bpy), 4,4'-di(t-butyl)-2,2'-bipyridyl(dTbpy), N,N,N',N",N"-pentamethyldiethylenetriamine (PMDETA), tris(2-dimethylaminoethyl)amine (TREN-Me), 4,4'-di(5-nonyl)-2,2'-bipyridyl (dNbpy), 4,4'-dialkyl-2,2'-bipyridyl (dAbpy, a mixture of 5-nonyl and n-pentyl alkyl chains), bis(2-bipyridylmethyl)octylamine and 4,4',4"-tris(5-nonyl)-2,2',6',2"-terpyridyl. The specific ligand must be chosen to meet the solubility requirements for controlled polymerization imposed by the suspension medium, the initiator, and other catalyst components such as the monomers/oligomers/polymers. Most preferred ligands include bpy, dNbpy, dAbpy, dTbpy, bis(2-pyridylmethyl)octylamine and 4,4',4"-tris(5-nonyl)-2,2',6',2"-terpyridyl.

In the ATRP reaction, almost 90% of the monomers will be consumed within a few hours after the polymerization is initiated. The amount of unreacted monomers may be further reduced by heating with free radical initiators at elevated temperature. The amount of initiator usually accounts for less than 2% of the monomers by weight.

(2) Secondary Polymerization of Hydrophobic Monomers in Emulsion

Monomers with hydrophobic moieties are add at this stage to form block copolymers with the ATRP products. Preferred hydrophobic monomers include methyl methacrylate, butyl methacrylate, hexyl acrylate, ethyl hexylacrylate, styrene, and mixtures thereof. The most preferred hydrophobic monomers include methyl methacrylate, hexyl acrylate and a mixture thereof. The polymerization is usually carried out in emulsion in the presence of a surfactant. Preferred surfactants include dioctyl sulfosuccinate, trimethyl ammonium bromide, and Rhodafac RS710. A cross-linker may be added at this stage to increase the shear stability of the polymers. Preferred cross-linkers include ethylene glycol dimethacrylate, pentaerythritol tetraacrylate, pentaerythritol triacrylate, 3-(acryloyloxy)-2-hydroxypropyl methacrylate, ethyleneglycol dimethacrylamide, or other polymerizable monomers with di- or polyfunctional groups. The reaction mixture is stirred for 24 hours at ambient temperature.

The weight ratio between the hydrophilic monomers in step (1) and the hydrophobic monomers in step (2) is preferably 1:9. When a mixture of methyl methacrylate and hexyl acrylate is used as hydrophobic monomers in step (2), the ratio between the two monomers may very from 2:8 to 8:2, with a preferred ratio of 5:5. The amount of surfactant should be less than 3% of the reaction mixture by weight, and preferably 2% of the reaction mixture by weight. All the manipulations in steps (1) and (2) are carried out under nitrogen atmosphere.

(3) Filtration and Neutralization

The reaction mixture is filtered to remove any precipitates formed during the polymerization. The filtered reaction product is then neutralized (pH 6–8) to obtain stable polymeric particles. The polymeric particles obtained from the above-described process have an average diameter of 50 to 400 nm with a pre-determined structure, a molecular weight range of 20–100 kD, and a polydispersity index of 1–1.2.

Ink Composition Containing Amphipathic Particles as a Dispersant

The present invention also provides an ink composition comprising a vehicle, a colorant, a surfactant, and a polymeric dispersant/binder produced by the side chain conversion method or ATRP method.

The vehicle may be water or a mixture of water and one or more humectants.

The colorant may be pigments or dyes. Pigments are preferred colorants since they are water insoluble. Pigments do not dissolve upon contact with water and/or run when exposed to water. They also provide superior smear resistance and light stability compared to dyes.

The dyes used in the present invention are preferably polymerizable dye monomers. These polymerizable dyes may be incorporated into the amphipathic polymers using the above-described methods. The optical density of the dye is preserved since it lies on the outside of the particle in the water phase. Moreover, the dye itself acts like a stabilizing group for the particles.

The ink may contain as much as 30% colorant by weight, but generally the colorant is in the range of 0.1 to 15% by weight of the total ink composition. Preferably, the colorant represents 0.1 to 8% of the total ink composition.

The amount of surfactant is in the range of 0.01% to 5% by weight, preferably 0.1% to 3% by weight, more preferably 0.5% to 1% by weight.

The surfactant may be an anionic, cationic, amphoteric or nonionic surfactant, or a compatible mixture thereof.

Examples of anionic surfactants are water-soluble soaps or water-soluble synthetic surface active compounds.

Examples of the soaps are unsubstituted or substituted ammonium salts of higher fatty acids ($C_{10}$–$C_{22}$), such as the sodium or potassium salts of oleic acid or stearic acid or of natural fatty acid mixtures such as coconut oil or tallow oil, alkali metal salts, alkaline earth metal salts or fatty acid methyllaurin salts.

Examples of synthetic surfactants are alkylarylsulphonates, sulphonated benzimidazole derivatives, fatty alcohol sulphates, or fatty alcohol sulphonates.

Examples of alkylarylsulphonates are the calcium, sodium or triethanolamine salts of dodecylbenzenesulphonic acid, dibutylnaphthalenesulphonic acid, or a condensate of naphthalenesulphonic acid and formaldehyde, or the phosphate salt of the phosphoric acid ester of an adduct of p-nonylphenol with 4 to 14 moles of ethylene oxide.

Examples of sulphonated benzimidazole derivatives are those with at least one sulphonic acid group or one fatty acid radical containing approximately 8 to 22 carbon atoms.

Examples of non-ionic surfactants are polyglycol ether derivatives of aliphatic or cycloaliphatic alcohols having approximately 3 to 30 glycol ether groups and approximately 8 to 20 carbon atoms in the (aliphatic) hydrocarbon moiety; saturated or unsaturated fatty acid and alkylphenols having approximately 6 to 18 carbon atoms in the alkyl moiety of the alkylphenols; water-soluble adducts of polyethylene oxide with ethylenediaminopolypropylene glycol, polypropylene glycol, or alkylpolypropylene glycol having approximately 1 to 10 carbon atoms in the alkyl chain, having approximately 20 to 250 ethylene glycol ether groups and approximately 10 to 100 propylene glycol ether groups in the usual ratio of 1 to 5 ethylene glycol moiety:propylene glycol moiety; fatty acid esters of polyoxyethylene sorbitan such as polyoxyethylene sorbitan trioleate; octylphenoxypolyethoxyethanol; polyethylene glycol; tributylphenoxypolyethyleneethanol; polypropylene/polyethylene oxide adducts; castor oil polyplycol ethers; and nonylphenolpolyethoxyethanols.

Examples of cationic surfactants are quaternary ammonium salts in the form of halides, methylsulphates or ethylsulphates which have as N-substituent at least one $C_{8-C22}$ alkyl radical or unsubstituted or halogenated lower alkyl or benzyl or hydroxy-lower alkyl radical, such as stearyltrimethylammonium chloride or benzyldi(2-chloroethyl) ethylammonium bromide.

Examples of amphoteric surfactants are the aminocarboxylic and aminosulphonic acids and salts thereof such as alkali metal 3-(dodecylamino)propionate and alkali metal 3-(dodecylamino)propane-1-sulphonate or alkyl and alkylamido betaines such as cocamidopropyl betaine.

Examples of surfactants which may be used in the combination are surfactants from the Teric.RTM. series such as N4 Teric, Teric BL8, Teric 16A16, Teric PE61, Alkanate 3SL3, N9 Teric, G9 A6 Teric, or surfactants from the Rhodafac.RTM. series such as Rhodafac RA 600. Further examples are Calgon.RTM. (sodium hexametaphosphate), Borax.RTM. (sodium decahydrate borate), soap, sodium lauryl sulphate, or sodium cholate.

The dispersant comprises polymer particles produced by the side chain conversion method or ATRP method. The particles must be small enough to permit free flow of the ink through the ejecting nozzle of an inkjet printer. Ejecting nozzles typically have a diameter ranging from 10 μm to 50 μm. In addition, the polymer size influences the stability of the dispersion, since large particle are more likely to precipitate. Accordingly, the polymer particles have an average diameter of 50 to 500 μm. Ideally, the average particle size is about 300 nm.

The ink may contain as much as 8% dispersant by weight, but generally the dispersant is in the range of 1% to 5% by weight of the total ink composition. Preferably, the dispersant represents 2% to 3% of the total ink composition.

The ink composition may also include UV absorbers, anti oxidants and hindered amines to improve the stability and durability of printed images.

Although preferred embodiments and their advantages have been described in detail, various changes, substitutions and alterations may be made herein without departing from the spirit and scope as defined by the appended claims and their equivalents.

EXAMPLE 1
Preparation of Stable Polymer Particles by Side Chain Conversion Method Methyl methacrylate (88.8 g), hexyl acrylate (88.8 g), mono-methacryloyloxyethyl succinate (20 g), ethylene glycol dimethacrylate (2.4 g) and isooctylglycolate (1.0 g) were mixed together to form a monomer mixture. Water (67.7 g) and 30% Rhodafac (16.67 g) were then added to the monomer mixture and sheared gently to form an emulsion. At the same time, 600 ml water was heated to 90° C. A 0.7% potassium persulfate solution (100 ml) was prepared and added dropwise to the heated water at a rate of 2 ml/min. The emulsion was then added to the heated water dropwise over a period of 40 min to form a reaction mixture. The reaction mixture was maintained at 90° C. and allowed to cool down after 1 h. When the temperature reached 55° C., 20 g of 17.5% potassium hydroxide was added to bring the pH of the reaction mixture to pH>7. The reaction mixture was filtered with a 200 mesh filter to obtain stable polymer particles with an average size of 260 μm. The resultant polymers were diluted with water to 4% by weight, heated to 60° C., and subjected to a shear test with constant stirring at high speed (setting 7) for 5 min using a Waring Commercial Laboratory Blender (model number 34BL97). The particle size and viscosity were measured before and after the test.

EXAMPLE 2
Preparation of Stable Polymer Particles by Side Chain Conversion Method The experiment in Example 1 was repeated with the following amounts of starting materials. Methyl methacrylate (84 g), hexyl acrylate (84 g), mono-methacryloyloxyethyl succinate (30 g), and ethylene glycol dimethacrylate (2 g).

EXAMPLE 3
Preparation of Stable Polymer Particles by Side Chain Conversion Method The experiment in Example 1 was repeated with the following amounts of starting materials. Methyl methacrylate (70 g), hexyl acrylate (90 g), mono-methacryloyloxyethyl succinate (38 g), and ethylene glycol dimethacrylate (2 g).

EXAMPLE 4
Preparation of Stable Polymer Particles by Side Chain Conversion Method The experiment in Example 1 was repeated with the following amounts of stating materials. Methyl methacrylate (88.8 g), hexyl acrylate (88.8 g), mono-methacryloyloxyethyl succinate (20 g), and ethylene glycol dimethacrylate (2 g).

EXAMPLE 5
Preparation of Comparative Polymer Particles

The experiment in Example 1 was repeated by removing mono-methacryloyloxyethyl succinate and ethylene glycol dimethacrylate under identical conditions.

EXAMPLE 6
Preparation of Stable Polymer Particles by ATRP Method

A mixture was prepared by dissolving 80 mg a-Bromo-p-toluic acid in 7 ml water containing 20% sodium hydroxide (140 mg), followed with 2,2'-dipyridyl (120 mg) and copper (I) bromide (60 mg). A solution of mono-methacryloyloxyethyl methacrylate (2 g) in water (2 g) containing 20% sodium hydroxide (0.8 g) was then added to the mixture to start the ATRP at ambient temperature. The reaction was exothermic and the temperature of the reaction mixture rose from 19.3° C. to 21.4° C. in 15 min. After 30 min, an emulsion containing methyl methacrylate (5 g), hexyl acrylate (5 g), Rhodafac RS710 (0.25 g), and water (3 g), was prepared and added to the reaction mixture to start the secondary polymerization. The reaction mixture was then stirred for 24 h at ambient temperature and filtered through a 200 mesh filter to remove a small quantity of precipitate. Potassum persulfate (80 mg) was added to the filtrate. The filtrate was heated to 90° C. for 1 h, cooled to ambient temperature, and neutralized to pH 8 with 20% sodium hydroxide to obtain stable particles. The average particle size is 145 nm.

EXAMPLE 7
Preparation of Ink Compositions

Inks are prepared by a standard procedure. Typically, a pigment dispersed in water is mixed with humectants (non-penetrating and penetrating), a surfactant, and the polymer prepared according to the methods in the present invention. The final concentrations of each ingredient are:

| | |
|---|---|
| pigment | 3% by weight, |
| polymer | 3% by weight |
| penetrating humectant | 10% by weight |
| non-penetrating humectant | 10% by weight |
| surfactant | 1% by weight |
| water | remainder |

Example for penetrating humectant is N-methyl pyrrolidone. Example for non-penetrating humectant is diethylene glycol. Examples for surfactant are surfynol 420, surfynol 465 and surfynol 470. Example for pigment is Cab-O-Jet 300, although other pigments are equally applicable. The mixture is shaken or stirred to obtain a uniform ink solution.

In order to perform a print test, the ink is filled into the black ink cartridge of a HP Deskjet printer prototype product and is printed at a frequency of 20 kHz.

TABLE 1

Shear test results for polymers prepared in Examples 1–5

| | Polymer Particle size | | |
|---|---|---|---|
| | Before stirring | After stirring | Test result* |
| Example 1 | 260 | 265 | Pass |
| Example 2 | 225 | 235 | Pass |
| Example 3 | 290 | 320 | Pass |
| Example 4 | 250 | 240 | Pass |
| Example 5 | 260 | Polymer precipitated**. | Fail |

*A polymer particle passes the shear teat if the particle size difference before and after the stirring is less than 10%.
**Polymer particles in the example 5 did not pass the test because no stabilizer is present.

TABLE 2

Water fastness and smear fastness test results for inks containing polymers prepared in Examples 1–6

| Ink containing polymer from | Waterfastness (mOD*) | Smearfastness (mOD) |
|---|---|---|
| Example 1 | 1 | 75 |
| Example 2 | 5 | 80 |
| Example 3 | 4 | 75 |
| Example 4 | 5 | 80 |
| Example 5 | 0 | 30 |
| Example 6 | 4 | 60 |
| No polymer | 450 | 300 |

*The optical density is measured by a Mac Beth densitometer.

What is claimed:

1. Amphipathic polymer particles prepared by polymerizing a plurality of components comprising:
   an unsaturated monomer containing a hydrophobic moiety, and
   an unsaturated monomer containing a convertible moiety that is hydrophobic in an acidic environment and hydrophilic in a basic environment,
   wherein the amphipathic polymer particles are configured to be stable in an aqueous solution.

2. The amphipathic polymer particles of claim 1, wherein the content of polymeric units derived from the unsaturated monomer containing a convertible moiety is in the range of 1% to 60% by weight.

3. The amphipathic polymer particles of claim 1, further comprising a polymerizable dye monomer.

4. The amphipathic polymer particles of claim 1, further comprising a cross linker.

5. The amphipathic polymer particles of claim 1, wherein the content of polymeric units derived from the unsaturated monomer containing the hydrophobic moiety is in the range of 30% to 99% by weight, and the content of polymeric units derived from the unsaturated monomer containing convertible moiety is in the range of 1% to 60% by weight.

6. Amphipathic polymer particles prepared by polymerizing a plurality of components consisting essentially of:
   an unsaturated monomer containing a hydrophobic moiety, and
   an unsaturated monomer containing a convertible moiety that is hydrophobic in an acidic environment and hydrophilic in a basic environment,
   wherein the amphipathic polymer particles are configured to be stable in an aqueous solution.

7. The amphipathic polymer particles of claim 6, wherein the unsaturated monomer containing a hydrophobic moiety is selected from the group consisting of $C_{1-20}$ alkyl or cycloalkyl acrylates and methacrylates, $C_{1-20}$ hydroxyalkyl acrylates and methacrylates, styrene, and mixtures thereof.

8. The amphipathic polymer particles of claim 7 wherein the unsaturated monomer containing a hydrophobic moiety is selected from the group consisting of methyl methacrylate, butyl methacrylate, hexyl acrylate, ethyl hexylacrylate, styrene, and mixtures thereof.

9. The amphipathic polymer particles of claim 6 wherein the unsaturated monomer containing a convertible moiety is selected from the group consisting of mono-methacryloyloxyethyl succinate, mono-acryloyloxyethyl succinate, mono-methacryloyloxyethyl phthalate, acrylamindobutyric acid, mono-methacryloyloxyethylmaleate, and methacryloyloyethylphosphate.

10. The amphipathic polymer particles of claim 6 wherein the amphipathic polymer particles have a size range of 50–500 nm.

11. The amphipathic polymer particles of claim 6, wherein the content of polymeric units derived from the unsaturated monomer containing the hydrophobic moiety is in the range of 30% to 99% by weight, and the content of polymeric units derived from the unsaturated monomer containing the convertible moiety is in the range of 1% to 60% by weight.

12. Amphipathic polymer particles prepared by polymerizing a plurality of components consisting essentially of:
   an unsaturated monomer containing a hydrophobic moiety in the range of 30% to 99% by weight;
   an unsaturated monomer containing a convertible moiety that is hydrophobic in an acidic environment and hydrophilic in a basic environment in the range of 1% to 60% by weight;
   the unsaturated monomer containing a hydrophobic moiety is selected from the group consisting of methyl methacrylate, butyl methacrylate, hexyl acrylate, ethyl hexylacrylate, styrene, and mixtures thereof;
   the unsaturated monomer containing a convertible moiety is selected from the group consisting of mono-methacryloyloxyethyl succinate, mono-acryloyloxyethyl succinate, mono-methacryloyloxyethyl phthalate, acrylamidobutyric acid, mono-methacryloyloxyethylmaleate and methacryloyloyethylphosphate; and
   the amphipathic polymer particles have a size range of 50–500 nm, and configured to be stable in an aqueous solution.

13. The amphipathic polymer particles of claim 12, wherein the convertible moiety is in the form of an anionic salt.

14. The amphipathic polymer particles of claim 6, wherein the convertible moiety is in the form of an anionic salt.

15. The amphipathic polymer particles of claim 1, wherein the convertible moiety is in the form of an anionic salt.

16. The amphipathic polymer particles of claim 4, wherein the cross linker is present at from 0.1%–5% by weight.

* * * * *